Patented Nov. 15, 1938

2,136,387

UNITED STATES PATENT OFFICE 2,136,387

PREPARATION OF DIVINYL ETHER

William A. Lott, East Orange, N. J., assignor to E. R. Squibb & Sons, New York, N. Y., a corporation of New York No Drawing. Application October 14, 1936, Serial No. 105,513

11 Claims. (Cl. 260—614)

This invention relates to, and has for its object the provision of, a method of preparing divinyl ether.

In the practice of the invention, divinyl ether is prepared by treating a $\beta,\beta'$-dihaloethyl ether with an alkali-metal alcoholate dissolved in the corresponding alcohol. The alcohols suitable for use in this reaction are those that form alkali-metal alcoholates having little or no tendency to undergo etherification when treated with alkyl halides; preferably alcohols selected from the group consisting of primary alcohols having at least seven carbon atoms, secondary alcohols, and tertiary alcohols. Preferably, the reaction mixture should be substantially anhydrous.

Example 1

800 g. of dry tertiary amyl alcohol is treated with 29.2 g. of sodium in a mechanically agitated reaction vessel fitted with a dropping funnel and a jacketed reflux condenser. When the reaction between the alcohol and sodium is complete, a downward condenser is attached to the reflux column, and the temperature of the jacket of the latter is adjusted to and maintained at approximately 40° C. The temperature of the reaction mixture is raised to the point necessary to maintain refluxing (external temperature 115–120° C.). Then 90.8 g. of $\beta,\beta'$-dichloroethyl ether is added gradually, whereupon the product, passing through the reflux column and condensing in the downward column, is collected in a receiver. After washing the distillate with ammonia and with water, drying with calcium chloride and with sodium, and fractionally distilling, the desired compound is obtained as a liquid boiling at 28–29° C.

Example 2

250 g. of anhydrous 2-ethyl hexyl alcohol is refluxed with 15 g. of sodium in an apparatus similar to that of Example 1. The temperature (external) is raised to 155–160° C., while 45 g. of $\beta,\beta'$-dichlorethyl ether is added gradually. The product, after passing through the reflux column, condenses in a receiver. The yield may be increased by adding an excess of dichlorethyl ether. After washing the distillate with dilute ammonia and with water, drying it with calcium chloride and with sodium, and fractionally distilling, the desired compound is obtained as a liquid boiling at 28–29° C.

Example 3

800 g. of anhydrous tertiary hexyl alcohol is refluxed with 20.4 g. of sodium in an apparatus similar to that of Example 1. The temperature of the solution is raised to 125–150° C., with agitation, whereupon 126 g. of $\beta,\beta'$-dichlorethyl ether is added gradually during an interval of 1½ hours. Washing, drying, and fractional distillation of the distillate, yields the desired compound.

In a similar manner, divinyl ether may be prepared by treating a $\beta,\beta'$-dihaloethyl ether with various other alkali-metal alcoholates dissolved in the corresponding alcohols, among them sodium ethoxy ethylate, sodium isopropylate, and sodium tertiary butylate.

It is to be understood that the foregoing examples are merely illustrative, and not limitative of this invention, which may be variously otherwise embodied—as by utilizing other alcohols, alkali-metal alcoholates, and procedures—within the scope of the appended claims.

I claim:

1. The method of preparing divinyl ether that comprises treating a $\beta,\beta'$-dihaloethyl ether with an alkali-metal alcoholate dissolved in the corresponding alcohol, the alcohol being one whose alkali-metal alcoholate has little tendency to undergo etherification when treated with an alkyl halide.

2. The method of preparing divinyl ether that comprises treating a $\beta,\beta'$-dihaloethyl ether with an alkali-metal alcoholate dissolved in the corresponding alcohol, the alcohol being one whose alkali-metal alcoholate has no tendency to undergo etherification when treated with an alkyl halide.

3. The method of preparing divinyl ether that comprises treating $\beta,\beta'$-dichloroethyl ether with an alkali-metal alcoholate dissolved in the corresponding alcohol, the alcohol being one whose alkali-metal alcoholate has little tendency to undergo etherification when treated with an alkyl halide.

4. The method of preparing divinyl ether that comprises treating a $\beta,\beta'$-dihaloethyl ether with an alkali-metal alcoholate dissolved in the corresponding alcohol, such alcohol being a liquid aliphatic alcohol selected from the group consisting of primary alcohols having at least seven carbon atoms, secondary alcohols, and tertiary alcohols.

5. The method of preparing divinyl ether that comprises treating a $\beta,\beta'$-dihaloethyl ether with an alkali-metal alcoholate dissolved in the corresponding alcohol, such alcohol being a liquid aliphatic alcohol having at least seven carbon atoms.

6. The method of preparing divinyl ether that comprises treating $\beta,\beta'$-dichlorethyl ether with an alkali-metal alcoholate dissolved in the corresponding alcohol, such alcohol being a liquid aliphatic primary alcohol having at least seven carbon atoms.

7. The method of preparing divinyl ether that comprises treating a $\beta,\beta'$-dihaloethyl ether with an alkali-metal alcoholate dissolved in the corresponding alcohol, such alcohol being a liquid aliphatic secondary alcohol.

8. The method of preparing divinyl ether that comprises treating a $\beta,\beta'$-dihaloethyl ether with an alkali-metal alcoholate dissolved in the corresponding alcohol, such alcohol being a liquid aliphatic tertiary alcohol.

9. The method of preparing divinyl ether that comprises treating $\beta,\beta'$-dichlorethyl ether with a substantially anhydrous solution of sodium 2-ethyl hexylate in 2-ethyl hexyl alcohol.

10. The method of preparing divinyl ether that comprises treating $\beta,\beta'$-dichlorethyl ether with a substantially anhydrous solution of sodium isopropylate in isopropyl alcohol.

11. The method of preparing divinyl ether that comprises treating $\beta,\beta'$-dichlorethyl ether with a substantially anhydrous solution of sodium tertiary hexylate in tertiary hexyl alcohol.

WILLIAM A. LOTT.